Patented May 11, 1926.

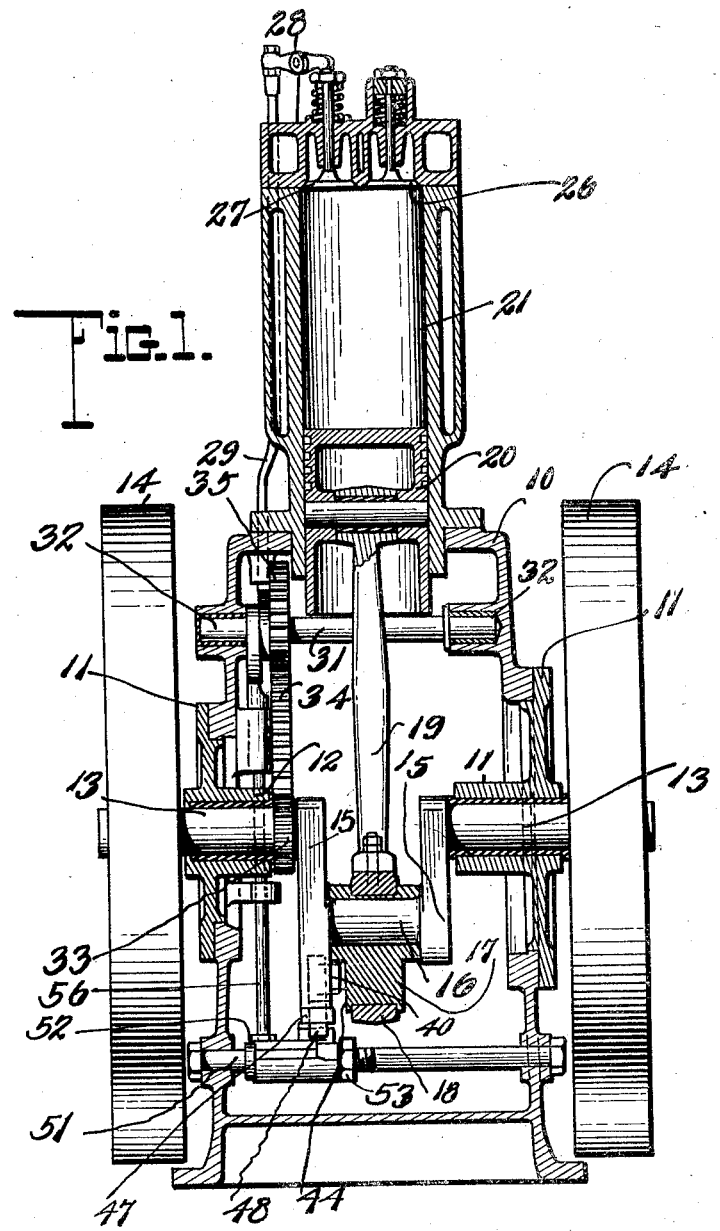

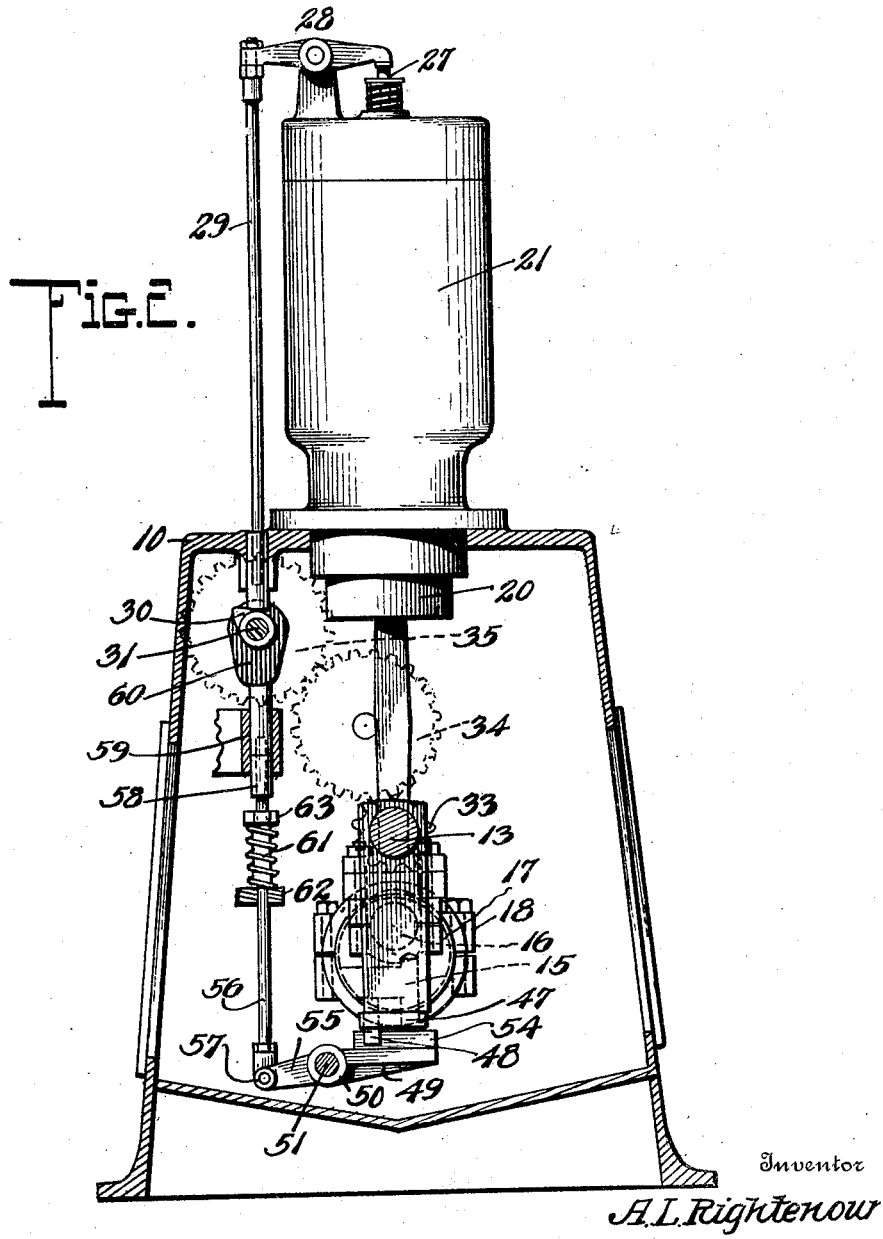

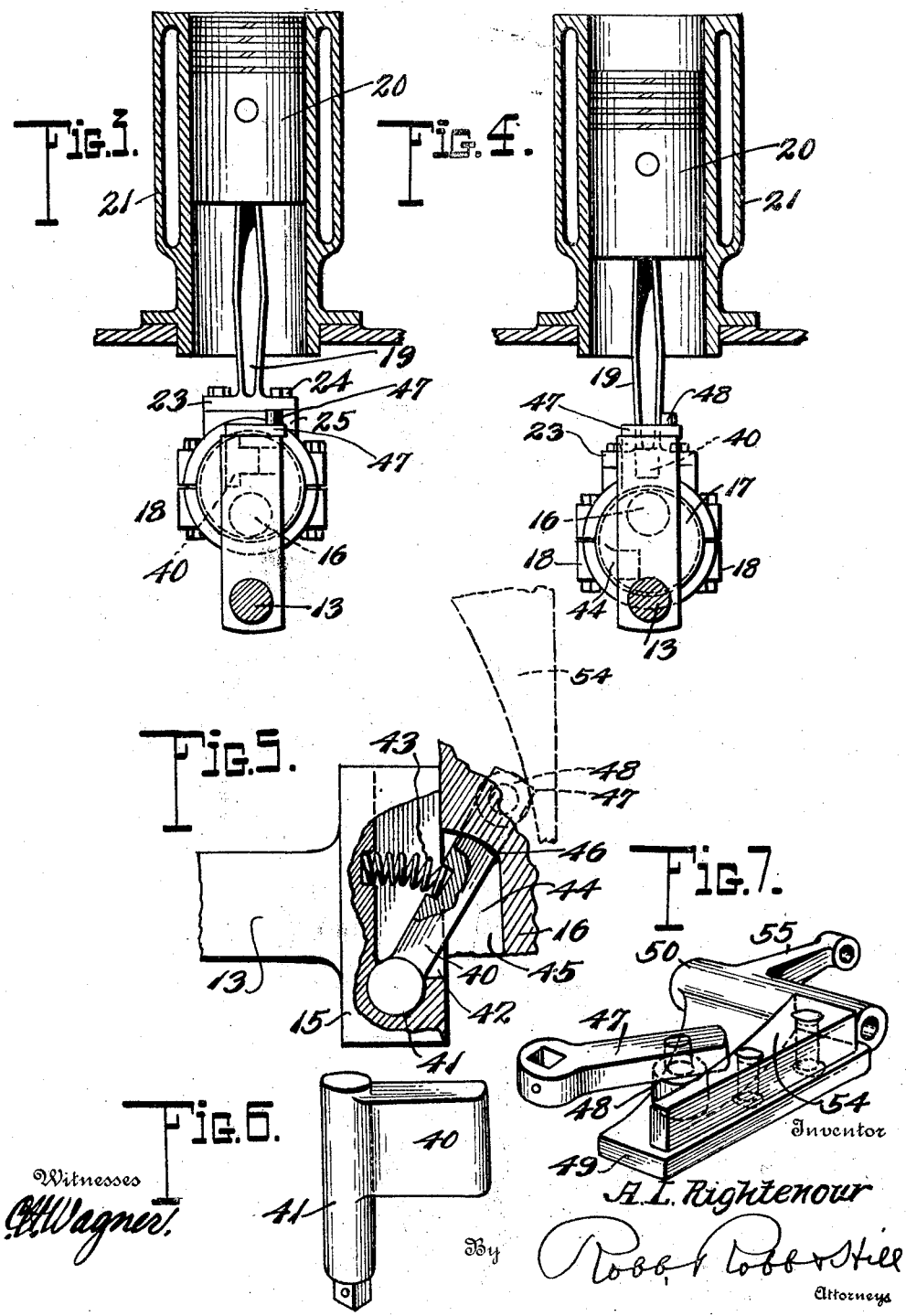

1,583,937

UNITED STATES PATENT OFFICE.

ASA LEE RIGHTENOUR, OF CHICAGO, ILLINOIS.

VARIABLE-STROKE ENGINE.

Application filed August 2, 1924. Serial No. 729,784.

This invention relates to a variable stroke engine of the four cycle type, and particularly to a construction wherein the piston has a longer stroke in its exhausting and intake cycles than during its compression and firing cycles in which it has a shorter stroke.

In this type of engine it is desirable to avoid a fixed or geared connection between the crank shaft and the cam thereon upon which the piston connecting rod is mounted as in such prior constructions a slow shifting of the cam occurs. In the geared connections where the ratio is two to one it will be seen that two revolutions of the crank shaft are necessary to properly position the cam for securing the maximum piston stroke. To obviate such objection I have provided a quickly detachable clutch connection between the piston rod controlling cam and the crank arm of the shaft, such clutch being automatically disengaged during the proper period for normal operation by a timed mechanism. This insures a complete scavenging action and the intake of a full charge which is more efficiently compressed on a succeeding shorter stroke.

The invention has for an object to provide a novel and improved construction in which the piston rod is mounted upon a cam or eccentric pivoted to the pin of the crank shaft and this shaft provided with a clutch connection adapted to automatically engage and disengage the cam at predetermined periods in the rotation of the crank shaft.

A further object of the invention is to provide a novel construction of clutch pawl by which the controlling cam for the piston connecting rod and the crank shaft are instantly connected when the proper parts are in alignment and adapted to be automatically disconnected by a withdrawal of said clutch pawl from the controlling cam.

Another object of the invention is to provide a novel and improved construction of trip lever connected with a timing mechanism and adapted to be thrown into the path of a member carried by a clutch pawl which connects the crank shaft and the controlling cam for the piston connecting rod.

Other and further objects and advantages of the invention will be hereinafter set forth and the novel features thereof defined by the appended claims.

In the drawings:—

Figure 1 is a vertical section showing an embodiment of the invention;

Figure 2 is a similar view at a right angle to Figure 1 with the cylinder in elevation;

Figure 3 is a detail section showing the parts in position for maximum piston stroke;

Figure 4 is a similar view with the parts connected for minimum piston stroke;

Figure 5 is a detailed enlarged section showing the clutch pawl in its relation to the stroke controlling cam and trip lever;

Figure 6 is a detail perspective of the clutch pawl; and

Figure 7 is a similar view of the trip plate and lever carried by the pawl.

Like reference numerals indicate like parts throughout the several figures of the drawings.

The invention may be embodied in any preferred type of engine and the number of cylinders thereof multiplied as found desirable consistent with the power to be developed. In the form shown the numeral 10 designates the engine base or frame which may be of any desired construction or configuration and is provided at opposite sides with the head plates 11 carrying bearings 12 for the crank shaft 13 which is herein shown as provided with fly wheels 14 at its opposite ends. This crank shaft is formed with the crank arms 15 connected by the crank pin 16 upon which a pivotally mounted cam or eccentric 17 is disposed. This cam is embraced by a suitable strap 18 connected to the piston rod 19 which extends to the piston 20 disposed in the cylinder 21 as usual.

The strap or bearing 18 may be formed in separate parts secured together by suitable fastening devices and a desirable form for connecting the piston rod to this bearing is by means of a head 23 at the end of the rod secured to the bearing by fastening bolts 24 extending into the block 25 upon the bearing so that if it be desired to remove the piston without disconnection of the bearing the bolts 24 are withdrawn and the bearing left undisturbed upon the cam.

The cylinder 21 is provided with the usual intake valve 26 and exhaust valve 27 the latter being adapted to be operated by means of a pivoted rocker 28 from which the valve rod 29 extends to the engine base 10 where it is adapted to be actuated by a timing cam 30 upon the countershaft 31 having bearings 32 at its opposite ends in the engine base. This shaft 31 is actuated for control of the valve movements by a suitable gearing connection from the crank shaft, such as the pinion 33 mounted thereon meshing with a gear 34 which in turn meshes with gear 35 upon the shaft 31.

Under normal conditions of use the cam upon the crank pin rotates thereon and is disconnected from the arms of the crank shaft, which arrangement provides for a minimum stroke of the piston as the cam travels with the bearing of the connecting rod. When it is desired to increase this stroke so that the piston traverses substantially the entire length of the cylinder, for instance in the exhausting and intake cycles of the engine, the cam is connected to one of the crank shaft arms so as to travel as a unit therewith and thus rotates within the bearing of the piston rod. The result of this is to provide the maximum stroke and a desirable form of connection for that purpose comprises the clutch pawl 40 which is pivotally mounted at 41 in a recess 42 formed within one of the arms 15 of the crank shaft 13. This pawl is normally projected outward from the recess by a tension spring 43 seated at its opposite ends in the pawl and recess. The pawl when projected enters a seat 44 in the cam 17 which provides an abutting wall 45 to receive the strain of the joint rotation of the parts. One end of this recess may be curved as at 46 to permit the entrance of the pawl in a curved path and form an abutment for the end of the pawl.

For the purpose of withdrawing the pawl when it is desired to disconnect the crank shaft and cam for the minimum stroke, a lever 47 is secured to the lower end of the pivot 41 of the pawl and provided with a friction roller 48 which cooperates with a trip plate 49 having an elongated bearing 50 mounted upon a shaft 51 carried by the engine frame. This bearing may be adjusted longitudinally upon the shaft by means of the nuts or collars 52 and 53 mounted thereon. The trip plate carries upon its upper surface a track cam 54 of suitable configuration to engage the roller 48 and retract the clutch pawl from its seat in the piston rod cam. The plate 49 is also formed with an operating arm 55 adapted to be controlled by suitable timing mechanism, for instance that used for the valve mechanism as shown in Figure 2 where the rod 56 is pivotally connected at 57 with the arm 55 and at its upper end provided with a contact 58 mounted in a bearing 59 and adapted to be engaged by a cam 60 carried upon the shaft 31 of the valve timing mechanism. This rod 56 is normally held in elevated position so as to withdraw the trip plate from the path of the clutch by means of a spring 61 bearing against a fixed support 62 and against a nut or collar 63 secured to the rod 56.

The general operation of this mechanism will be apparent from the foregoing description from which it will be seen that when the trip plate is elevated the clutch for the connecting rod cam is withdrawn so that the cam travels as a unit with said rod and has a bearing upon the pin of the crank shaft, this position of parts being shown in Figure 2. As soon as the lever arm of the pawl leaves the track cam upon the trip plate, or this plate is depressed by the passage of the cam upon the valve control shaft the spring acting upon the pawl automatically throws it into engagement with the side wall of the piston rod cam so that it will seat in the recess therein and connect these parts to cause said cam to travel as a unit with the arms of the crank shaft, thus insuring the maximum travel of the piston for substantially the entire length of the cylinder, as shown by the arrangement of parts in Figures 1 and 3.

By this arrangement when the piston has completed a short stroke or one complete revolution, the trip plate acts to permit the clutch to engage the piston rod cam so that the succeeding stroke of the piston is for its maximum length, this change being preferably effected at the lower dead center as shown by the present illustration of the invention.

The construction herein shown avoids the objection of the slow change in the assembly through a geared connection and provides for an instant connection and disconnection between the parts so that the full advantage of the eccentric acting upon the piston rod is secured from the instant of its connection to that of its disconnection.

The specific construction of the trip plate provides means for positively disconnecting and holding the clutch during the short stroke while the spring actuation of the clutch effects its automatic connection when the cooperating members upon the crank arm and eccentric are in alignment. I thus effect a quick connection and disconnection by simple mechanism adapted to secure the most efficient results and to be accurately controlled by the timing mechanism of the engine.

While the details of construction have been specifically shown and described, still the invention is not confined thereto as changes and alterations may be made therein without departing from the spirit of the invention as defined by the appended claims.

Having thus described my invention, what I claim as new and desire to secure by Letters Patent is:

1. In an internal combustion engine, a piston, a driven shaft, a rod connection between the piston and shaft, means freely mounted upon said shaft for controlling the rod connection therewith to effect different lengths of piston stroke at different cycles of operation, and cooperating means between the shaft and the first mentioned means for connecting the same for movement with the shaft at one point in its rotation.

2. In an internal combustion engine, a piston, a driven shaft, a rod connection between the piston and shaft, means freely mounted upon said shaft for controlling the rod connection therewith to effect different lengths of piston stroke at different cycles of operation, and cooperating means between the shaft and first mentioned means for automatically connecting and disconnecting the first mentioned means relative to the driven shaft.

3. In a variable stroke engine, a cylinder and piston therein, a crank shaft having a connecting rod to said piston, means freely mounted upon the crank shaft and carrying said rod for varying its bodily length of stroke, and means upon the crank shaft to directly connect or disconnect said stroke varying means relative to the crank shaft.

4. In a variable stroke engine, a cylinder and piston therein, a crank shaft having a connecting rod to said piston, means freely mounted upon the crank shaft and carrying said rod for varying its bodily length of stroke, means upon the crank shaft to directly connect or disconnect said stroke varying means relative to the crank shaft, and timed means for controlling the disconnection of said connecting means.

5. In a variable stroke engine, a cylinder and piston therein, a crank shaft having a connecting rod to said piston, means upon the crank shaft for varying the pivotal connection of said rod with the crank shaft to effect different lengths of stroke of said piston, and means for automatically connecting and disconnecting said stroke varying means relative to the crank shaft.

6. In a variable stroke engine, a cylinder and piston therein, a crank shaft having a connecting rod to said piston, means freely rotatable upon the crank shaft for varying the length of stroke of said piston, and a clutch member carried by the crank shaft and shiftable to engage the stroke varying means thereon.

7. In a variable stroke engine, a cylinder and piston therein, a crank shaft having a connecting rod to said piston, means freely rotatable upon the crank shaft for varying the length of stroke of said piston, a clutch member carried by the crank shaft and disposed to engage the stroke varying means thereon, and a timed trip plate shiftable to retract said clutch.

8. In a variable stroke engine, a cylinder and piston therein, a crank shaft having a connecting rod to said piston, an eccentric upon said shaft upon which said rod is mounted, a clutch member carried by the shaft and disposed to interlock with said eccentric, means for automatically throwing said clutch member into interlocking position, and means for automatically retracting said member from such position.

9. In a variable stroke engine, a cylinder and piston therein, a crank shaft having a connecting rod to said piston, an eccentric rotatable on said crank shaft upon which said rod is mounted, a pivoted clutch pawl mounted upon said crank shaft and tensioned toward said eccentric, and means for retaining said pawl in retracted position.

10. In a variable stroke engine, a cylinder and piston therein, a crank shaft having a connecting rod to said piston, an eccentric rotatable on said crank shaft upon which said rod is mounted, a pivoted clutch pawl mounted upon said crank shaft and tensioned toward said eccentric, and a pivoted trip plate provided with a cam face adapted to actuate a lever upon the pivot of said pawl to retract the same from said eccentric.

11. In a variable stroke engine, a cylinder and piston therein, a crank shaft having a connecting rod to said piston, means upon said crank shaft for varying the length of stroke of said piston, an intermittently engaged member carried by the crank shaft to engage the stroke varying means, a controlling plate for said engaging member pivotally mounted and provided with a cam face to engage said member, and means for automatically actuating said controlling plate.

12. In a variable stroke engine, a cylinder and piston therein, a crank shaft having a connecting rod to said piston, means upon said crank shaft for varying the length of stroke of said piston, an intermittently engaged member carried by the crank shaft to engage the stroke varying means, a controlling plate for said engaging member pivotally mounted and provided with a cam face to engage said member, a geared counter shaft provided with a cam, and an actuating rod engaging said cam and connected to said controlling plate.

13. In a variable stroke engine, a cylinder provided with intake and exhaust valves, a piston therein having a rod connected to a crank shaft, an eccentric disposed between said rod and the crank pin of said shaft, a latch device upon the crank shaft for connecting the same to said eccentric, and means for automatically actuating said latch device to connect and disconnect the eccentric for rotation upon the crank shaft.

14. In a variable stroke engine, a cylinder provided with intake and exhaust valves, a piston therein having a rod connected to a crank shaft, an eccentric disposed between said rod and the crank pin of said shaft, a latch device upon the crank shaft for connecting the same to said eccentric, a lever arm from said latch device, a pivoted trip plate provided with a cam surface adapted to be disposed in the path of said lever, and a geared connection between said crank shaft and said trip plate.

15. In a variable stroke engine, a cylinder and piston therein, a crank shaft having a connecting rod for said piston, means rotatable upon the crank shaft for varying the length of stroke of said piston, a device upon the crank shaft for intermittently connecting and disconnecting the stroke varying means, a pivoted trip plate for controlling said last mentioned means, a shaft upon which said plate is mounted, and means for adjusting said plate longitudinally of said shaft.

In testimony whereof I affix my signature.

ASA LEE RIGHTENOUR.